July 10, 1956 R. D. COLMERY 2,753,646
REVERSIBLE REEL-RECEIVING FISHING ROD HANDLE
Filed Dec. 1, 1952 2 Sheets-Sheet 1
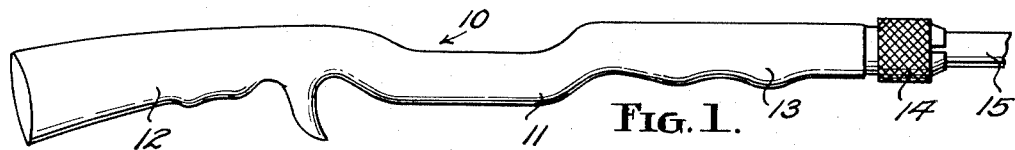
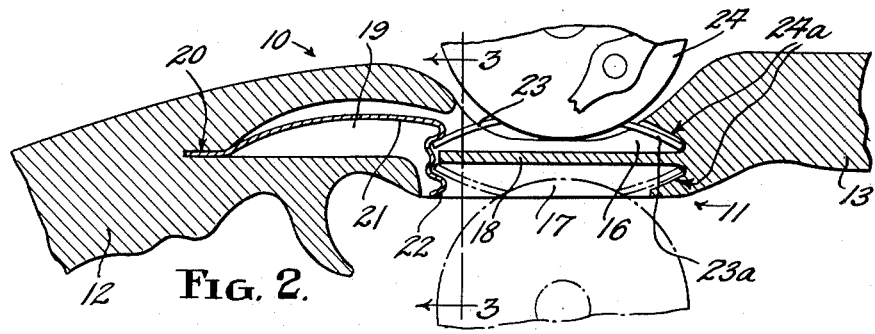
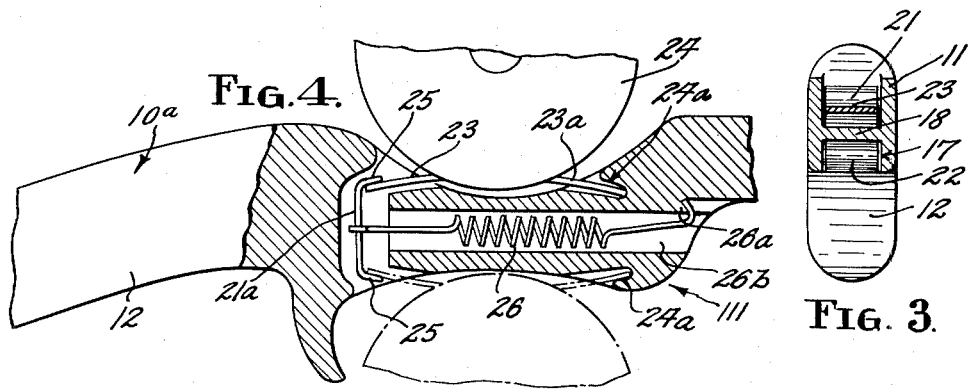
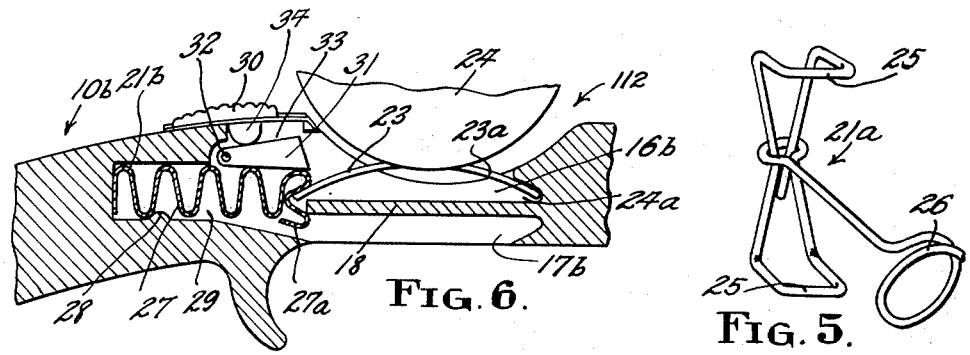
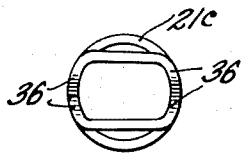
INVENTOR
Robert D. Colmery
BY M. S. McDowell
ATTORNEY July 10, 1956 R. D. COLMERY 2,753,646
REVERSIBLE REEL-RECEIVING FISHING ROD HANDLE
Filed Dec. 1, 1952 2 Sheets-Sheet 2
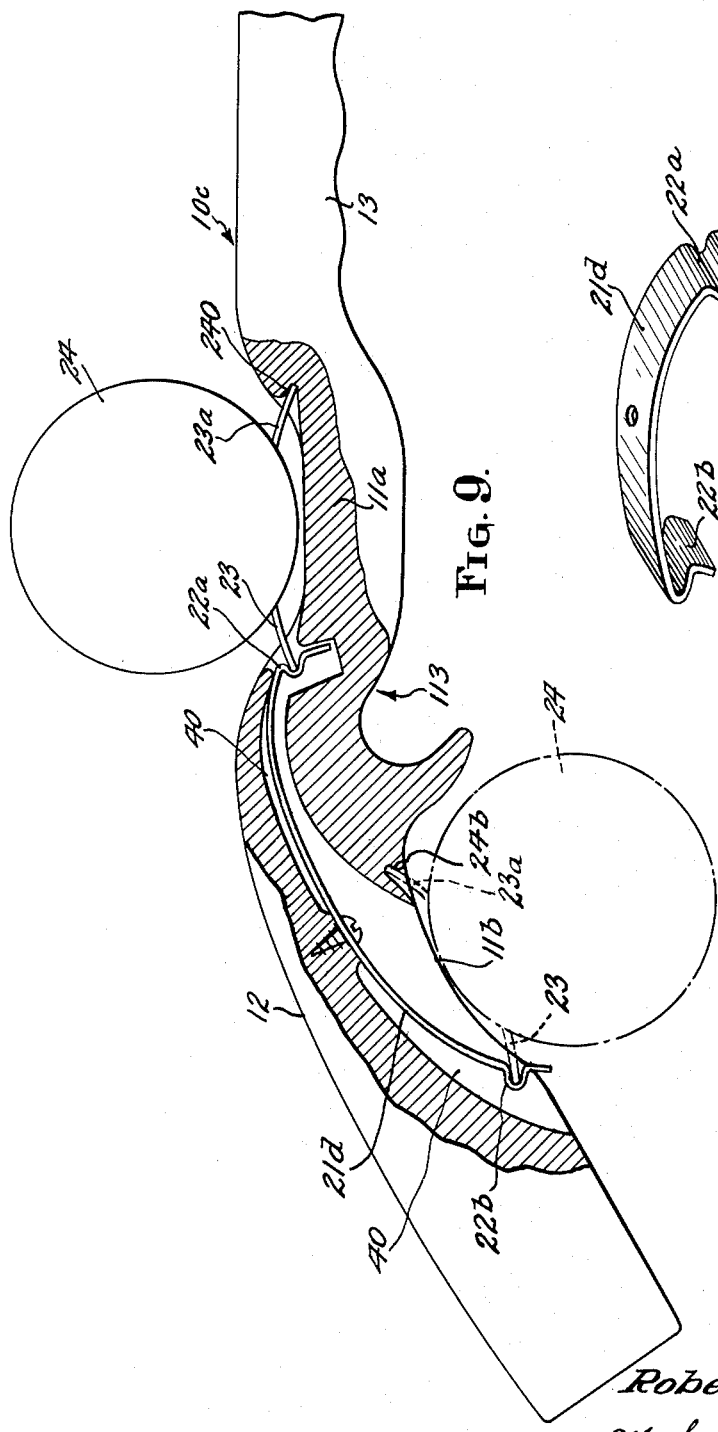
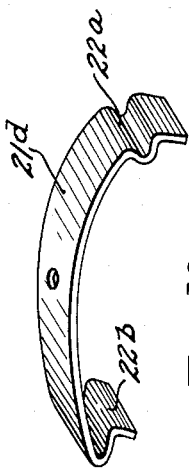
INVENTOR
Robert D. Colmery
BY
ATTORNEY United States Patent Office 2,753,646
Patented July 10, 1956

2,753,646

REVERSIBLE REEL-RECEIVING FISHING ROD HANDLE

Robert D. Colmery, Columbus, Ohio

Application December 1, 1952, Serial No. 323,469

2 Claims. (Cl. 43—22)

This invention relates to fishing rod handles, having particular reference to a fishing rod handle of the type having formed therein means for securely but detachably holding conventional line reels in association therewith.

While there are many different types of fishing rods, two or more popular types are to be found in rods adapted for use in casting and those adapted for fly fishing. Casting rods are characteristically comparatively short, heavy and less resilient than those utilized for fly fishing. Also, their handle constructions differ. In a rod adapted for casting, the handle construction is so formed that a mount provided thereon for the reception of an associated line reel is placed so that the reel will be disposed upwardly on the handle and in advance of the hand-receiving and gripping portions thereof. In the handle construction for a fly rod, the reel is usually placed on the under side of the handle and the hand-gripping portion of the latter is arranged in advance of the reel, the feeding of the line from the reel outwardly being controlled by the fingers, so that slack in the line may be taken up as needed. Normally, therefore, this construction requires two different handle members for receiving separate casting and fly fishing rods and reels.

Hence, it is an object of the present invention to provide a composite handle construction for fishing rods in which said handle construction is adapted to be used in connection with either casting or fly rods.

It is another object of the invention to provide an improved handle construction for fishing rods having relatively front and rear hand-gripping portions disposed on both sides of a mounted line reel, whereby the handle construction may be grasped and adapted readily to either casting or fly-fishing operations.

A further object is to provide a composite fishing rod handle having forwardly and rearwardly located hand-gripping portions, and wherein said handle further includes a reversible mount by which a conventional line reel may be mounted in either upwardly or downwardly projecting positions with relation to the handle, thereby further assisting in rendering the handle construction adaptable to different types of fishing rods and the operations required to be performed thereby.

Still a further object of the invention resides in the provision of improved mounting means for securely but detachably connecting line reels in association with the handle body.

Other objects and advantages of the present invention will be apparent from a consideration of the following description and the accompanying drawings, wherein:

Fig. 1 is a side elevational view of a composite fishing rod handle formed in accordance with the present invention;

Fig. 2 is a vertical longitudinal sectional view taken through the central portion of the handle of Fig. 1 and disclosing a preferred mounting incorporated therein for the reversible support of a line reel in association with the handle;

Fig. 3 is a vertical transverse sectional view taken on the line 3—3 of Fig. 2;

Fig. 4 is a detail vertical longitudinal sectional view disclosing a modified form of reel mount and wherein is incorporated the reversible features of the present invention;

Fig. 5 is a detail perspective view of the resilient reel-retaining member employed in the construction disclosed in Fig. 4;

Fig. 6 is also a vertical longitudinal sectional view setting forth another modification of a reversible reel mount for fishing rod handles constructed in accordance with the features of the present invention;

Fig. 7 is a detail side elevational view showing a coil spring type of a reel-retaining member adapted for use by the present invention;

Fig. 8 is an end elevational view of the member disclosed in Fig. 7;

Fig. 9 is a vertical longitudinal sectional view disclosing a further modified form of reel mount;

Fig. 10 is a detailed perspective view of the resilient reel-retaining member employed in the construction disclosed in Fig. 9.

Referring more particularly to the drawings, the fishing rod handles disclosed therein, and designated generally by the numerals 10, 10a, 10b and 10c are preferably formed of any suitable high strength, lightweight materials, such as aluminum, magnesium, metal alloys, wood, synthetic resins, and various other suitable materials now commonly employed in the formation of fishing rod handles.

The handle members are formed intermediate their ends with reel-receiving regions 11, 111, 112 and 113. On opposite sides of this region, each handle member is formed to include a pistol-type gripping stock 12, and a forward gripping portion 13. This gripping portion at its extreme forward end is equipped with a threaded jaw-type clamping chuck 14 or its equivalent, in which is received and clamped the inner or handle end of a fishing rod 15. The latter may be of any suitable type adapted for casting or fly fishing. The construction of the chuck is such as to enable the same to receive rod sections of different diameter and to separably and firmly retain the same in secured and detachable connection with said handle members.

Referring particularly to Figs. 1 to 3, inclusive, the reel-receiving region of each of the handle members is provided with an upwardly disposed inwardly directed reel-receiving recess 16. The latter is formed in the upper part of each of the handle members and a complemental shallower recess 17 is formed in the lower part of each handle member. The recesses 16 and 17 are separated by a substantially flat horizontally extending divisional wall 18, which preferably constitutes an integral portion of the body of the handle member with which it is formed.

As shown in Fig. 2, the handle member 10 therein is provided internally with a spring-receiving chamber 19. One end of this chamber terminates in a narrow slot 20 in which is positioned and confined the flat rear end of a reel-retaining resilient member 21. This member includes a longitudinally arched body which, when operatively positioned, as shown, extends forwardly from the slit 20 through the chamber 19 and has its forward end terminated in a corrugated or serrated depending web 22. This web is located at the rear edge of the divisional wall 18, and is positioned to receive the outer end of an arcuate base leg 23 carried by a conventional line reel 24. The opposite base leg 23a of said reel is positioned in a substantially V-shaped notch 24a provided in the forward undercut ends of the recesses 16 and 17.

By this construction, it will be seen that when the handle is used in connection with a casting rod, the reel 24 will be disposed in the cut-out or dipped region 11 of the handle with the arcuate base legs of the reel positioned in the upper recess 16 in such manner that the leg 23 at the left of the reel is engaged by the resilient corrugated web 22 of the retaining member 21. The web presses forwardly on the leg 23 and the reel generally, and positively maintains the complemental leg 23a of said reel in its seated position in the upper one of the notches 24a. As shown by broken lines in Fig. 2 of the drawings, when the handle is used as a fly rod holder, the position of the reel 24 is reversed. When so reversed, the legs 23 and 23a will be arranged in the bottom recess 17 of the handle, and held in the bottom recess in the same manner as the reel legs are held in the upper recess, as previously described. To remove a reel from its engaged position with the handle with the use of the construction set forth, it is merely necessary to press rearwardly on the reel to flex the web 22 of the fastening member rearwardly. This permits of the withdrawal of the forward leg 23a from the notch 24a, and thus allows the reel to be lifted from its seated position in connection with the handle.

Variations in this construction are, of course, possible. For example, in Fig. 4 of the drawings, a different form of resilient retaining member 21a is used. This resilient retaining member comprises a generally bent wire stirrup which terminates at its opposite ends in a pair of inwardly directed resilient reel lips 25. To hold the stirrup in fastening engagement with the ends of the legs 23, the stirrup has fastened to its intermediate portion one end of a coil spring 26, the opposite end of the spring having hooked engagement, as at 26a, with the handle stock, the spring being mounted in a bore 26b formed in the intermediate reel-receiving region 111 of the handle member 10a.

In Fig. 6 a further modification has been set forth, wherein the resilient retaining member 21b is of strip formation and is bent to provide a multiplicity of longitudinally spaced corrugation-producing webs 27. The forward web 27a is shaped to receive the leg 23 of the reel 24, holding the latter against accidental displacement. One of the webs 27 has contact with a rounded bead 28 which forms a part of the chamber 29 in which the resilient retaining member 21b is positioned holding the member against displacement. The web 27a includes a resilient U-shaped region in which the outer end of the leg 23 is located. Normally this region is disposed in registry with the upper recess 16b formed in the intermediate reel-receiving region 112 of the handle member 10b. However, to depress the forward end of the member 21b so that the recess in the web 27a may be lowered into registry with the bottom recess 17b of the handle, and to thereby receive the leg 23 when the reel 24 is positioned on the bottom of the handle for fly fishing, the present invention provides the handle 10b on its upper side with a slide element 30. This element engages with a detent 31, the latter being pivoted as at 32 and formed with an inclined face 33, which contacts a lug 34 on the bottom of the slide 30. By advancing the slide, the lug 34 thereof, through its contact with the face 33, moves the detent 31 downwardly and depresses the forward end of the retaining member 21b. This is done so that the recess or socket in the web 27a thereof may be brought into registry with the bottom recess 17b of the handle 10b. By this arrangement, the reel may be securely held in either its top or bottom position, as described.

The modified resilient retaining member 21c, shown in Figs. 7 and 8, comprises a wire spring, having helical convolutions, and which is adapted to be confined in a chamber such as that indicated at 19 or 29 in Figs. 2 and 6 of the drawings. The forward end of the retaining member 21c terminates in a bail-like formation and is bent to form the inwardly converging side legs 36 which are adapted to receive the reel leg 23.

In the form of my invention illustrated in Figs. 9 and 10, the handle member 10c is formed with a forwardly disposed, upwardly opening reel-receiving region 11a for the reception of a reel 24 when the reel is positioned on the top side of the handle for casting purposes. The handle is also formed with a second downwardly opening reel-receiving region 11b, which is located in the underpart of the handle to the rear of the region 11a, the region 11b being adapted to receive the reel 24 when the latter is positioned on the underside of the handle, as when employed in fly fishing. The reel 24 is provided with the usual base legs indicated at 23 and 23a. In this instance the region 11a of the handle is formed with a recess or notch 240 in which the leg 23a is positioned, whereas the leg 23 has its outer edge engaged with the corrugated web 22a of a resilient retaining member 21d, the latter being disposed in an arcuate passage or chamber 40 formed in the handle member.

At its opposite end the retaining member 21d includes a corrugated resilient web 22b which is disposed in the lower end of the passage 40 to engage with the leg 23 of the reel 24 when the latter is positioned in the region 11b. When so positioned, the reel leg 23a is pressed forwardly by the spring 21d into seated engagement with a recess 24b.

In view of the foregoing, it will be seen that the present invention provides a composite fishing rod handle adapted either for casting or fly fishing. The construction of the handle is simple, and the fastening means provided therein for retaining a line reel in an operative position in which the reel either extends upwardly or downwardly from the handle are characterized by their positive construction and ease of operation.

I claim:

1. Handle construction for fishing rods, comprising: an elongated, rod-supporting body formed intermediately of its length with a pair of oppositely facing, longitudinally extending, reel-seating regions, said body adjacent each of said regions being formed with undercut notches for the seating reception of one end of the base of a reel positioned on said regions; and a common spring carried by and positioned in a chamber formed in said body and having means thereon arranged to engage and retain against displacement the base of a reel seated on either of said reel-seating regions.

2. A fishing rod handle, comprising: an elongated body formed intermediately thereof with a pair of oppositely facing, inwardly depressed, and longitudinally arranged, reel-seating regions, each of said regions terminating at one end thereof in an undercut pocket for the removable seating reception of a base leg of an associated reel; chamber means formed in said body and having openings disposed at the ends of each of said regions opposite said undercut pockets; and a reel-retaining spring positioned in said chamber means and engageable with the base leg of a reel seated on either of the reel-seating regions of said body for releasably holding such reel on either of said regions.

References Cited in the file of this patent

UNITED STATES PATENTS

| 426,616 | Goggin | Apr. 29, 1890 |
| 1,711,248 | Powell | Apr. 30, 1929 |
| 1,902,749 | Baird et al. | Mar. 21, 1933 |
| 1,955,648 | Nickler | Apr. 17, 1934 |
| 2,010,627 | Dileo | Aug. 6, 1935 |
| 2,485,144 | Espenship | Oct. 18, 1949 |
| 2,504,801 | Carlson | Apr. 18, 1950 |
| 2,628,446 | Colmery | Feb. 17, 1953 |

FOREIGN PATENTS

| 59,331 | Denmark | Dec. 22, 1941 |